United States Patent
Yocom et al.

[11] Patent Number: 6,071,432
[45] Date of Patent: Jun. 6, 2000

[54] LONG PERSISTENCE RED PHOSPHORS

[75] Inventors: Perry Neil Yocom, Princeton, N.J.; Diane Zaremba, Fairless Hills, Pa.

[73] Assignee: Sarnoff Corporation, Princeton, N.J.

[21] Appl. No.: 09/098,221

[22] Filed: Jun. 16, 1998

Related U.S. Application Data

[60] Provisional application No. 60/079,959, Mar. 30, 1998.

[51] Int. Cl.[7] .............................. C09K 11/55; C09K 11/56
[52] U.S. Cl. ................................ 252/301.45; 252/301.4 R
[58] Field of Search ......................... 252/301.45, 301.4 R

[56] References Cited

U.S. PATENT DOCUMENTS

| | | | |
|---|---|---|---|
| 2,979,467 | 4/1961 | Keller | 252/301.4 S |
| 4,725,344 | 2/1988 | Yocom et al. | 252/301.4 S |
| 4,755,324 | 7/1988 | Lindmayer | 252/301.4 |
| 4,818,434 | 4/1989 | Lindmayer | 252/301.4 |
| 4,857,228 | 8/1989 | Kabay et al. | 252/301.4 S |
| 5,043,096 | 8/1991 | Lindmayer | 252/301.4 |
| 5,650,094 | 7/1997 | Royce et al. | 252/301.4 |

FOREIGN PATENT DOCUMENTS 0 339 895   11/1989   European Pat. Off.

OTHER PUBLICATIONS

Chemical Abstract citation 118:48398, Huettl et al, "Luminescence Decay and Efficiency of the Europium (2+) Emission in Strontium Sulfide", Electroluminescence, Proc. Int. Workshop, 6th, pp 123–7, 1992 no month.

Urbach et al "On Infra–Red Sensitive Phosphors", Jour. Optical Soc. America, vol. 36, No. 7, pp. 372–381, Jul. 1946.

*Primary Examiner*—C. Melissa Koslow
*Attorney, Agent, or Firm*—William J. Burke

[57] ABSTRACT

Red and orange-red emitting long persistence phosphors based on strontium sulfide and activated with a divalent rare earth such as europium, can be made by heating in the presence of an ammonium halide, or a trivalent rare earth. Using ammonium halide as the flux, the red-emitting phosphor can be molded into a desired shape. Using ammonium halide and powdered alumina, the red-emitting phosphor can be made into a powder directly. Heating a rare earth activated (Eu) strontium sulfide in the presence of a trivalent rare earth salt in the presence of sulfur and a source of carbon, fine particle size red-emitting phosphor particles can be made.

7 Claims, 1 Drawing Sheet

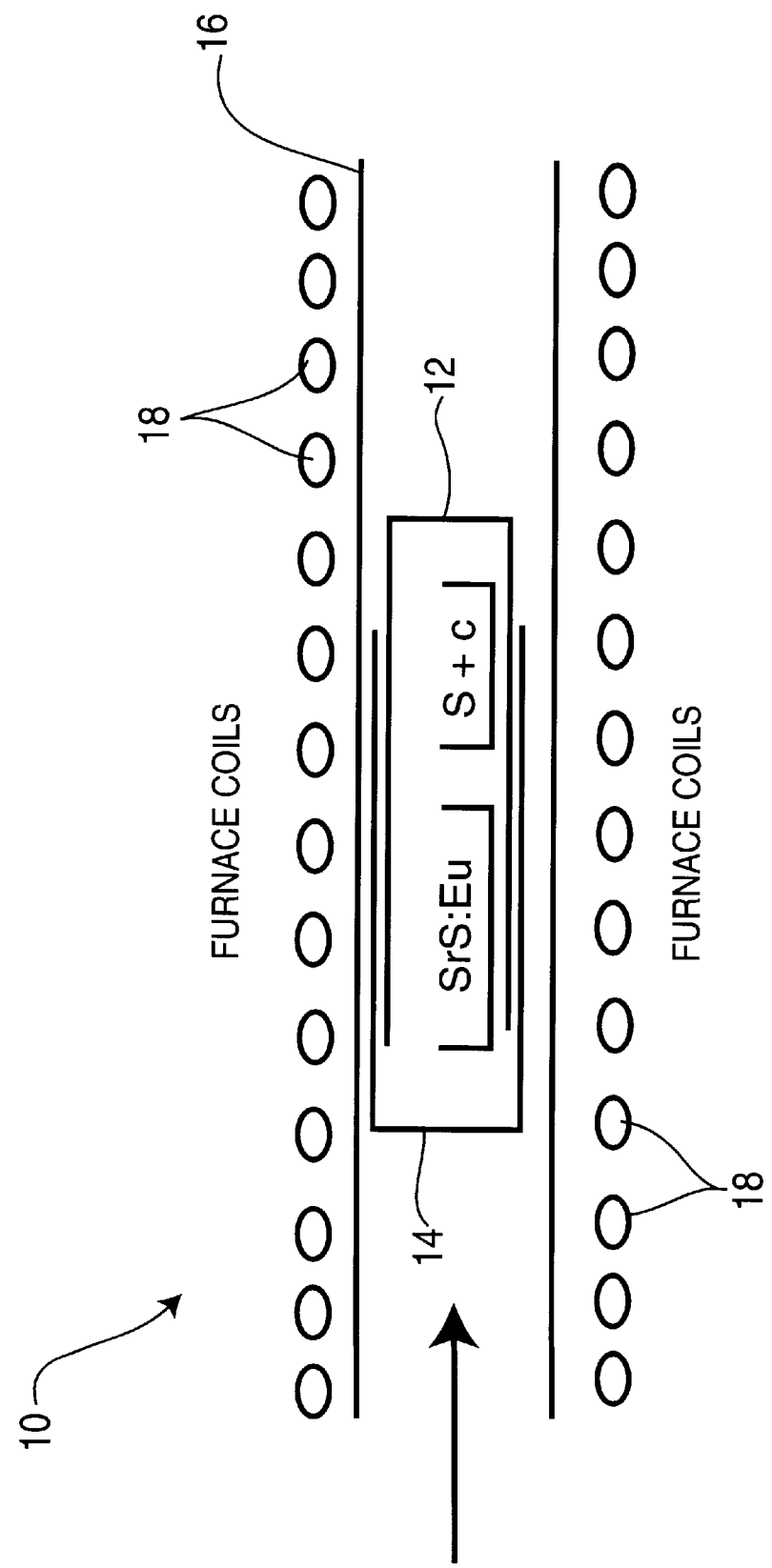

LONG PERSISTENCE RED PHOSPHORS

This application claims the benefit of the filing date of U.S. Provisional application Ser. No. 60/079,959 filed Mar. 30, 1998.

This application relates to long persistence emission red phosphors and their preparation. More particularly, this invention relates to strontium sulfide based phosphors activated with a divalent rare earth.

BACKGROUND OF THE INVENTION

Long persistence phosphors that emit in the green, blue-green and blue colorations have been known for some time. They include zinc-sulfide-based and strontium aluminate phosphors activated with rare earths.

However, orange and red hued long-persistence emitting phosphors have been disclosed only recently, and they have several serious drawbacks in use. For example, Royce et al, U.S. Pat. No. 5,650,094, discloses rare earth activated divalent titanate phosphors, such as $CaTiO_3$ or Ca—Zn—Mg—$TiO_3$, but the emission is visible only for a few minutes. Lindmayer, U.S. Pat. No. 5,043,096, reported a strontium sulfide based phosphor doped with three rare earths in the form of their oxides and fluxed with a halide, such as LiF. However, the fired fluoride phosphor was highly sintered and had to be ground to obtain a useful powdered material. However, grinding degrades the emission, and thus the phosphor must be heated or annealed to repair the crystal defect damage. However, the emission performance is never fully restored. These phosphors are described as being useful as additives to paint formulations.

Red phosphors are highly desirable because they are easy to see in the dark, particularly in the event of a power failure, for example for "EXIT" signs in a darkened theater, to mark fire fighting equipment, to make visible other safety devices and breathing masks, fire axes and the like. Safety devices and signs such as the above have long used red colors, and thus they are familiar to most persons. In addition, for decorative or novelty uses, such as for toys, automobile hub caps, sporting goods and the like, red is also a very desirable bright color.

Thus a red-emitting, long lasting phosphor has long been sought.

SUMMARY OF THE INVENTION

We have found that strontium sulfide (SrS) activated with divalent europium and co-activated either with a halide, such as chlorine or bromine, or a trivalent rare earth, forms long lasting, bright red phosphors after firing. A halide-containing solid sintered red emitting phosphor can be molded directly into a desired shape during firing, or, if mixed with alumina powder, can form a phosphor powder directly. Alternatively, a SrS:Eu doped with any trivalent rare earth ions, such as holmium (Ho), erbium (Er), neodymium (Nd) and the like, can be fired in sulfur vapor contacted to or passed over a carbon source to produce a $SC_2$ atmosphere. This method also forms a powder directly.

BRIEF DESCRIPTION OF THE DRAWING

The FIGURE is a schematic view of a furnace useful for making powdered rare earth phosphors of the invention.

DETAILED DESCRIPTION OF THE INVENTION

The long lasting red emitting phosphors of the invention are selected from the formulas

wherein X can be chlorine or bromine and M is a trivalent rare earth including praseodymium (Pr), neodymium (Nd), samarium (Sm), gadolinium (Gd), terbium (Tb), dysprosium (Dy), holmium (Ho), erbium (Er), thulium (Tm) and lutecium (Lu). They can be prepared in several ways as described hereinbelow.

Long persistence phosphors refer to the spectral emission of phosphor materials which, after excitation with light, emit red or orange-red colored light for several hours after the light source is removed.

SrS is doped with divalent europium as the prime activator. The amount of europium (Eu) added can be from 0.01 to 2.0 atomic percent, preferably about 0.1 atomic percent, of the sulfide. Secondary halide and rare earth co-activators can be added in several ways.

One method of preparing the halide phosphors comprises adding an ammonium halide, $NH_4X$, wherein X is chlorine or bromine, to the Eu activated SrS and heating at a temperature of from about 900 to 1500° C., preferably about 1000 to 1300° C. At these elevated temperatures, the SrS is converted to the chloride according to the equation $$SrS + 2NH_4Cl \rightarrow SrCl_2 + 2NH_3 + H_2S$$

Since $SrCl_2$ melts at about 900° C., after sintering the SrS:Eu:X takes the shape of the sintering container. Thus by proper choice of the container, solid phosphors of a desired shape can be formed. The molded phosphor can be encapsulated against moisture and used to fasten to a bicycle, sneakers, jacket, wall and the like as desired to draw attention to the item to be highlighted. These phosphors have a long persisting orange-red color.

Alternatively, the SrS:Eu starting material can be mixed with about 20 to 60 percent by weight of powdered alumina prior to firing with ammonium halide. In this case, the alumina powder retards sintering of the phosphor, and the product remains as a powdered material. Thus no grinding that will degrade the phosphor emission is required at all. The resultant phosphor powders can be readily added to a matrix material, such as a powdered or molten plastic, fibers and the like, that can encapsulate or encompass the phosphor against the effects of moisture to which it is sensitive.

In still another embodiment, the present long persisting red phosphor can be made by forming a SrS:Eu:M phosphor and firing at about 120° C. in the presence of vaporized sulfur which is passed over a carbon source. The vaporized sulfur and carbon forms a dilute $CS_2$ gas atmosphere during firing. The resultant material is not sintered, but instead forms a fine particle size phosphor having a long persistence. A powdered form of the phosphor cannot be obtained by conventional hydrogen sulfide firing. This phosphor also has a strong orange-red color.

In still another method, SrS:Eu:M is fired in a concentrated $CS_2$ atmosphere which leaves a coating of carbon on the phosphor. This carbon coating can be removed by firing in a sulfur atmosphere, to form a red emitting, long persisting SrS:Eu:M phosphor.

In this embodiment, strontium carbonate is dissolved in nitric acid, forming a solution of strontium nitrate. The corresponding strontium sulfate is precipitated with ammonium sulfate. The insoluble sulfate is separated from the solution and slurried with nitrate solutions of europium and one or more trivalent rare earth nitrates, such as $Er(NO_3)_3$. This slurry is dried, fired at a temperature from 1000 to 1200° C. for about 3 hours in forming gas (a mixture of nitrogen and hydrogen) and then fired in $H_2S$ for three hours at a temperature of about 1000 to 1150° C., to produce a strontium sulfide phosphor, such as SrS:Eu:Er. The rare earth elements can be present in amounts of from 0.005–5% by weight of each element, and is preferably present in amounts of 0.05–0.5% by weight.

This product is then heated in a semi-closed system such as is shown in FIG. 1 to form the long persistent phosphor.

Referring to FIG. 1, the system 10 is formed with two tubes 12 and 14, each open at one end, the tube 12 being small enough to be insertable in tube 14. A suitable phosphor, such as SrS:Eu:Er as prepared above, is placed in the smaller tube 12, together with a quantity of elemental sulfur, generally in an amount of about 2–10% by weight of the phosphor precursor, and a source of carbon such as sugar charcoal. The tubes 12 and 14 are assembled and placed in an open furnace 16 through which a flow of inert gas, such as nitrogen or argon, is maintained in the direction of the arrow. The assembly is heated at about 1150° C. by means of the furnace coils 18. The system 10 can maintain a one atmosphere pressure of vaporized sulfur, which can escape through the open ends of the tubes 12 and 14.

After cooling, a red emitting, long persistence powdered phosphor is obtained that persists for several hours. Th e particle size of the phosphor powder s obtained by heating the phosphor precursor with sulfur in the furnace of FIG. 1 is about 20–40 microns.

In general, the red emitting phosphors of the invention emit at about 610 nm. These phosphors will emit when excited by daylight in the red to orange-red color range for at least one hour. Excitation is also obtained by light in the near UV range, e g., 365 nm.

Since the phosphors will degrade in the presence of moisture they must be either preformed and coated with a water-impervious transparent coating, as of a suitable plastic, or the powder can be mixed with a water-impervious material, such as a paint.

The phosphors of the invention are useful as coatings, mixed with various moisture resistant carriers such as epoxies, polyurethanes, fiberglass, glues and sealants, and the like. The molded materials can be formed into desired shapes, encapsulated in a moisture-resistant carrier or coating, and used directly.

Many uses for these phosphors are apparent, including addition to safety signs, door handles, license plates, safety reflectors, nightlight applications, rails, steps, switch plates, toilet seats and other items in order to obtain visibility in the dark, as well as sporting equipment, such as rackets, balls, nets, hoops, bicycles, golf and baseball clubs, for affixing to clothing so that the wearer is visible in low light, for toys and novelties, for control buttons or keys for devices such as cellular telephones, beepers, cameras, and remote controls for VCRs and television sets. These are examples only and many more uses will be apparent to those skilled in the art.

Although the above phosphors and method of making them have been explained in terms of specific embodiments, variations in the activators, precursor salts, methods of making and the like will be apparent to those skilled in the art and are meant to be included herein. The scope of the invention is only to be limited by the appended claims.

We claim:

1. A method of making a powdered long persistence strontium sulfide based red emitting phosphor comprising heating a europium activated strontium sulfide in the presence of ammonium halide at a temperature of from about 900 to 1500° C.

2. A method of making a solid, long persistence SrS based red emitting phosphor comprising heating a Eu activated strontium sulfide in the presence of $NH_4X$ at a temperature of from about 900 to 1500° C. wherein the phosphor is made in a mold.

3. A method of making a powdered long persistence strontium sulfide based red emitting phosphor comprising mixing europium activated strontium sulfide with powdered alumina, and heating in the presence of an ammonium halide at a temperature of about 900 to 1500° C.

4. A method of making a long persistence strontium sulfide based red emitting phosphor comprising activating with divalent europium and a trivalent rare earth and firing at a temperature of about 1200° C. in the presence of vaporized sulfur passed over a carbon source to form a $CS_2$ atmosphere.

5. A method according to claim 4 wherein the europium rare earth is present in an amount of from about 0.01 to 2 atomic percent of the strontium sulfide.

6. A method according to claim 4 wherein the trivalent rare earth is selected from the group consisting of praseodymium, neodymium, samarium, gadolinium, terbium, dysprosium, holmium, erbium, thulium and lutecium.

7. A method according to claim 6 wherein the trivalent rare earth is erbium and the firing temperature is about 1200° C.

* * * * *